(12) United States Patent
Li

(10) Patent No.: US 6,231,199 B1
(45) Date of Patent: May 15, 2001

(54) COLLECTING AND CONDENSING OPTICAL SYSTEM USING CASCADED PARABOLIC REFLECTORS

(75) Inventor: Kenneth K. Li, Arcadia, CA (US)

(73) Assignee: Cogent Light Technologies, Inc., Santa Clara, CA (US)

( * ) Notice: Subject to any disclaimer, the term of this patent is extended or adjusted under 35 U.S.C. 154(b) by 0 days.

(21) Appl. No.: 09/537,298

(22) Filed: Mar. 29, 2000

Related U.S. Application Data

(60) Provisional application No. 60/141,832, filed on Jul. 1, 1999, and provisional application No. 60/178,700, filed on Jan. 28, 2000.

(51) Int. Cl.[7] ................................................ G02B 5/08
(52) U.S. Cl. .................... 359/857; 359/858; 359/859; 359/861; 359/864
(58) Field of Search ............................... 359/857, 858, 359/859, 861, 864, 867, 868, 850, 728; 362/32, 241, 297, 247

(56) References Cited

U.S. PATENT DOCUMENTS

| Re. 32,912 | 4/1989 | Doyle | 356/244 |
|---|---|---|---|
| 3,986,767 | 10/1976 | Rexer et al. | 359/857 |
| 4,473,295 | 9/1984 | Doyle | 356/244 |
| 4,519,266 | 5/1985 | Reinecke | 74/471 XY |
| 4,608,622 | * 8/1986 | Gonser | 362/32 |
| 4,757,431 | 7/1988 | Cross et al. | 362/261 |
| 4,956,759 | 9/1990 | Goldenberg et al. | 362/297 |
| 4,957,759 | 9/1990 | Swartzel et al. | 426/399 |
| 5,191,393 | 3/1993 | Hignette et al. | 356/384 |
| 5,317,484 | 5/1994 | Davenport | 362/32 |
| 5,414,600 | 5/1995 | Strobl et al. | 362/263 |
| 5,430,634 | 7/1995 | Baker et al. | 362/347 |
| 5,707,131 | 1/1998 | Li | 362/32 |
| 5,777,809 | * 7/1998 | Yamamoto et al. | 359/869 |
| 5,900,973 | * 5/1999 | Marcellin-Dibon et al. | 359/487 |
| 5,986,792 | * 11/1999 | Rizkin et al. | 359/212 |

FOREIGN PATENT DOCUMENTS

| 0401351 | 9/1993 | (EP) . |
|---|---|---|
| 2 718 825 | 10/1995 | (FR) . |

* cited by examiner

Primary Examiner—Mohammad Sikder
(74) Attorney, Agent, or Firm—Rothwell, Figg, Ernst & Manbeck, P.C.

(57) ABSTRACT

An electromagnetic radiation collecting and condensing optical system includes a plurality of cascaded concave paraboloid reflectors and a plurality of electromagnetic radiation or light sources which radiate light energy onto the concave reflectors in such manner that the energy from each source is combined by the reflectors into an output target, such as the end of a single core optical fiber.

31 Claims, 7 Drawing Sheets

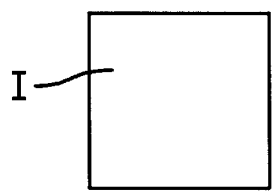
FIG. 6A    FIG. 6B
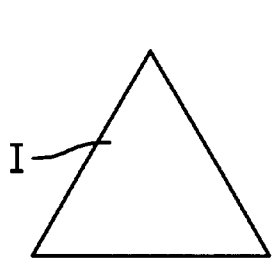
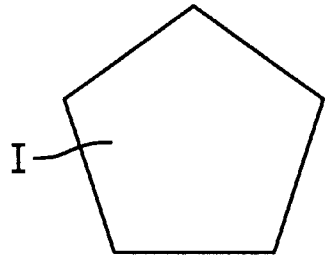
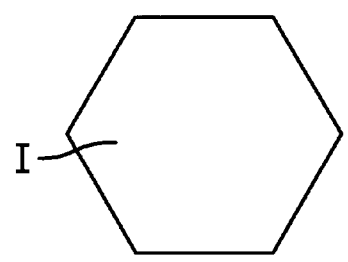
FIG. 6C    FIG. 6D    FIG. 6E
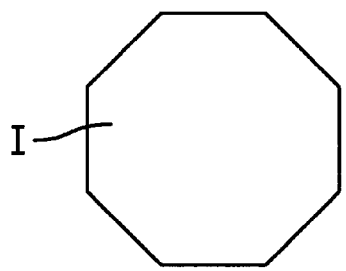
FIG. 6F
FIG. 8A
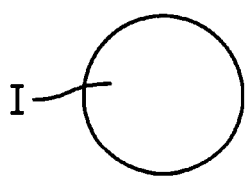
FIG. 7
FIG. 8B

COLLECTING AND CONDENSING OPTICAL SYSTEM USING CASCADED PARABOLIC REFLECTORS

This application claims the benefit of Provisional Ser. Nos. 60/141,832 filed July 1, 1999 and 60/178,700 filed Jan. 28, 2000.

FIELD OF THE INVENTION

This invention relates generally to illumination systems and more particularly relates to optical systems for collecting and condensing electromagnetic radiation down to a very small spot size for coupling to a target.

BACKGROUND OF THE INVENTION

One of the major goals when collecting and condensing radiation, particularly visible light, from a source into a target is the maximization of the brightness of the light at the target. Various configurations using on-axis elliptical and parabolic reflectors, and off-axis reflectors of various shapes have been used. Since the brightness of the image created at the target theoretically only can be conserved in an ideal optical system (and is reduced in a non-ideal system) it is impossible to increase the total flux at the target above the amount which is emitted by the source.

One common technique used to combat this fundamental limitation is the use of an arc lamp as the source in combination with a retro-reflector such that the light emitted from one side of the arc lamp is redirected by the retro-reflector back through the arc. Since the absorption of the reflected light by the arc is very small, light emitted from the opposite side of the arc lamp comprises both the light radiating from the arc itself as well as the retro-reflected light. Thus, the total light flux emitted from the side of the lamp opposite the retro-reflector is effectively doubled. Other prior art methods have extended this concept by reflecting light from the arc back into itself multiple times, thus increasing the flux further as in U.S. Pat. No. 4,957,759 to Goldenberg et al.

U.S. Pat. No. 5,707,131, the specification of which is herein incorporated by reference, discloses the use of multiple lamps in combination with multiple concave reflectors to focus the image of a first lamp's arc onto another lamp's arc in an off-axis cascaded configuration. FIGS. 1a and 1b illustrate the concept of using a cascading series of reflectors and sources aligned in an off-axis relationship for the coupling of light into a target as described in the above patent. The system comprises three main components: a plurality of sources $S_i$, a plurality of reflectors $M_i$, and at least one target I.

The plurality of sources $S_i$ are typically point sources of electromagnetic radiation, such as a high intensity arc lamp having an arc gap. However, any compact source of electromagnetic radiation with a small area of emission would be suitable.

The plurality of reflectors $M_i$ focus electromagnetic radiation from the source $S_i$ to at least one target I. In the '131 patent, the reflectors are mirrors having a concave surface facing the source and target. The reflective surfaces of the reflectors are either spherically, toroidally, or ellipsoidally shaped such that off-axis reflection can be achieved as is known in the art.

The target is a small object which is to be provided with illumination having the highest density of electromagnetic radiation possible, such as the end of a single core optical fiber or other optical lightguides.

Although a non-cascaded off-axis system produces minimal magnification which approximates a 1:1 magnification when the source to target distance is small, for the cascaded configuration disclosed in the '131 patent, the small amount of magnification created by the off-axis system will multiply and propagate as more lamps and reflectors are added to a cascade. Thus, significant magnification is often experienced at the target spot, corresponding to a decrease in flux density, and the amount of light coupled to the target is decreased. Because of the aforementioned and other drawbacks inherent in the prior art, there remains a need for an improved coupling system in which sources can be cascaded with a 1:1 magnification such that the efficiency of the cascade is not decreased as more lamps are added.

SUMMARY OF THE INVENTION

The present invention provides an optical system in which a plurality of sources and reflectors are provided in a cascading relationship, in such manner that the brightness of the sources is combined together to be inputted to a target, such as a single core optical fiber and other optical lightguides.

In particular, the present invention provides an electromagnetic radiation collecting and condensing optical system for providing a high intensity light output with a relatively high radiation flux in a small area, comprising a series of cascading sources and reflectors substantially in the shape of a paraboloid. Since such a system approaches a 1:1 magnification of the arc at the target substantially independent of the source to target distance, multiple lamps can be cascaded without degrading the effectiveness.

According to embodiments of the present invention, the resulting brightness at the target will be higher than the case with a single source, and is limited only by the number of sources and reflectors placed in cascade in the particular configuration. The invention also can alternatively be configured for two outputs instead of only one output. Furthermore, with a series of two or more sources in cascade, intensity and wavelength control can be carried out by turning individual sources on and off. An additional feature of the invention is the redundancy provided by having multiple sources in cascade. For applications where light intensity of less than all sources is required, according to embodiments of the present invention one source can serve as a backup source and turned on with virtually no downtime in the event of failure of another source.

BRIEF DESCRIPTION OF THE DRAWINGS

The present invention will become more fully understood from the detailed description given hereinbelow and the accompanying drawings, which are given by way of illustration only and which are not limitative of the present invention, and wherein:

FIGS. 6a–6f are schematic views of a plurality of polygonal lightguide (waveguide) targets in cross-sections which may be employed in embodiments of the present invention.

FIG. 7 is a schematic view of a circular cross-section lightguide target which may be utilized in the present invention.

FIG. 8a is a schematic side view illustrating an increasing taper lightguide target according to one embodiment of the invention.

FIG. 8b is a schematic side view illustrating a decreasing taper lightguide target in accordance with another embodiment.

DETAILED DESCRIPTION OF THE PREFERRED EMBODIMENTS

Figure 1A:
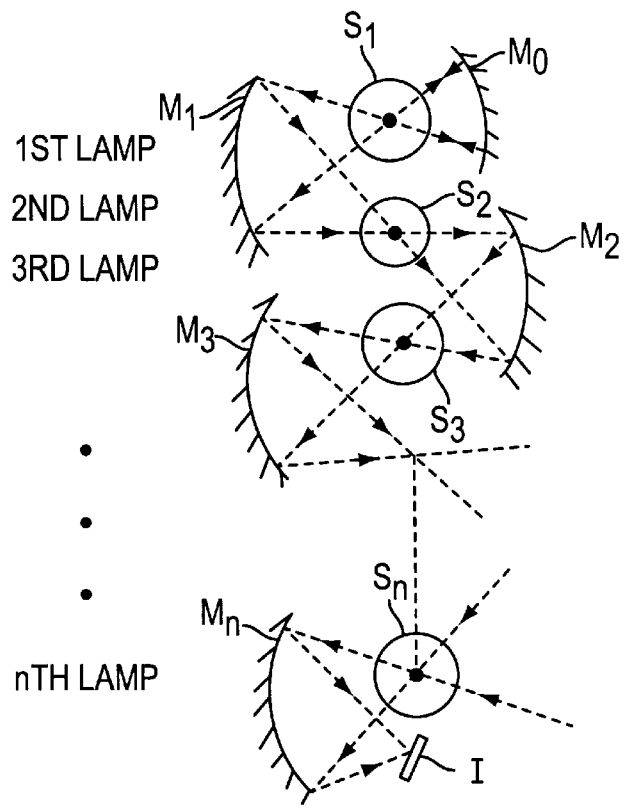
FIGS. 1a and 1b are schematic diagrams of a collecting and condensing system having cascading lamps and reflectors arranged in an off-axis configuration as is known in the art.
Figure 1B:
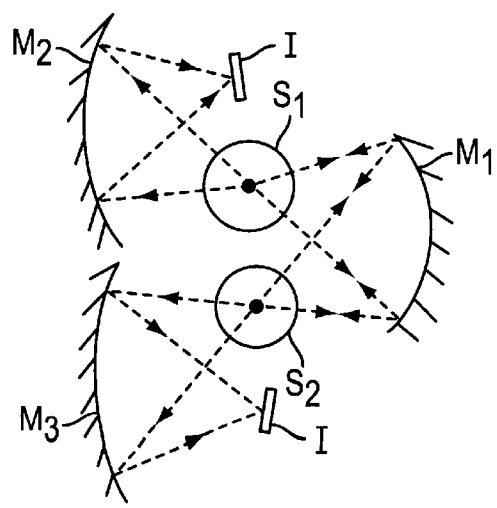
Figure 2A:
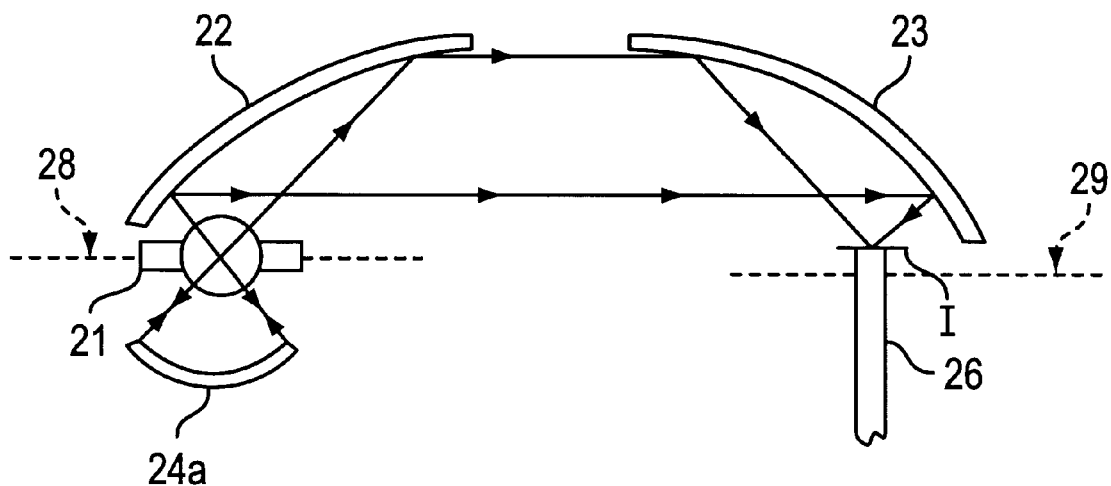
FIG. 2a is a schematic diagram of a fundamental unit of a collecting and condensing system according to the present invention using in combination a half-paraboloid collimating reflector, a half-paraboloid focusing reflector, and a spherical retro-reflector.
Figure 2B:
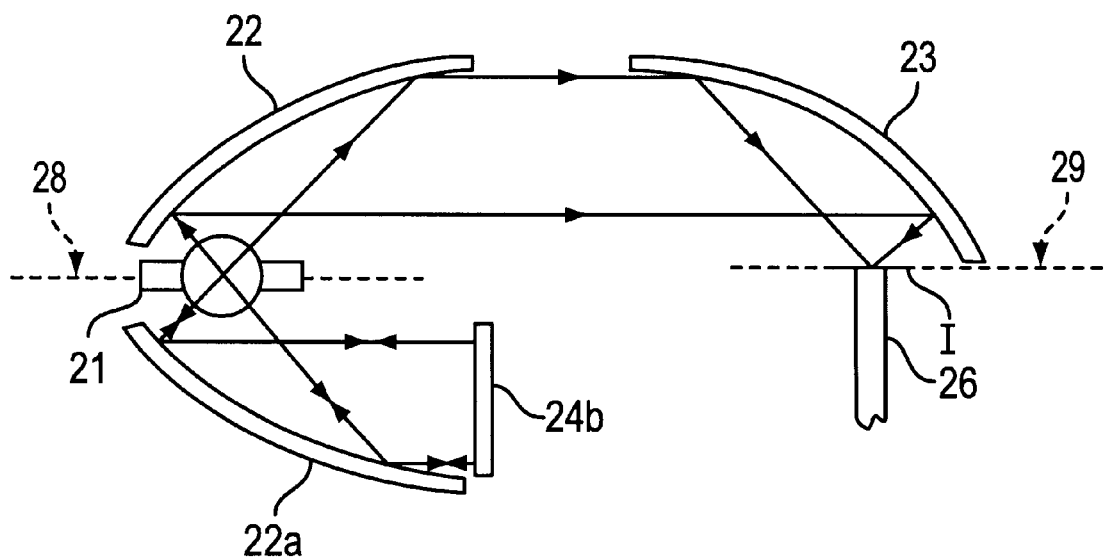
FIG. 2b is a schematic diagram of a fundamental unit of the collecting and condensing system according to the present invention using in combination a full paraboloid collimating reflector, a half-paraboloid focusing reflector, and a plane mirror retro-reflector.

FIGS. 2a and 2b schematically illustrate a system for the collecting and condensing of radiation, preferably visible light, into a target I comprising a single source 21, a paraboloid collimating reflector 22, and a focusing reflector 23. These three elements in combination serve as a fundamental unit for the present invention.

The source 21, preferably a high intensity arc lamp, is placed at the focus of the paraboloid collimating reflector 22. A particularly suitable arc lamp for use in embodiments of the present invention will have an arc gap which is small relative to the focal length of the paraboloid reflector 22 and comparable to the desired size of the target I. Such lamps can be mercury lamps, mercury xenon lamps, xenon lamps, metal-halide lamps, HID lamps, tungsten halogen, or halogen lamps. Those of ordinary skill in the art will readily appreciate that the lamp type and power rating should be chosen based upon particular application of the present invention.

The target I according to embodiments of the present invention can be any area upon which it is desirable to shine a concentrated spot of light upon. Such areas, for example, can be, but are not limited to, the surface of a lens, the input surface of lightguides, which can be a single fiber or a fiber bundle, homogenizers, hollow internally reflective tubes and other fiber optics, lightguides and combinations thereof. Suitable homogenizers for use in embodiments of the present invention include tapered or untapered polygonal waveguides, single core optical fibers, a fused or unfused bundle of optical fibers, or a fiber bundle.

When target I is a lightguide (waveguide), it can be polygonal in cross-section as shown in FIGS. 6a–6f or circular in cross-section as shown in FIG. 7. Further, Target I can be an increasing taper lightguide as shown in FIG. 8a or a decreasing taper lightguide as shown in FIG. 8b.

All reflectors according to preferred embodiments of the present invention are mirrors having a very high reflective optical coating thereon, such as aluminum or silver. Such mirrors are highly effective in reflecting all forms of radiation, including ultraviolet, visible, and infrared light. For certain applications, the reflectors of the present invention can comprise mirrors made out of glass and coated with wavelength selective multi-layer dielectric coatings. For example, a cold coating with high reflectivity only in the visible wavelengths can be used for visual applications. As will be appreciated by one of ordinary skill in the art, various coatings can be used alone or in combination in embodiments of the present invention.

As depicted in FIG. 2a, the paraboloid collimating reflector 22 in this embodiment of the fundamental unit is shaped substantially like a half-paraboloid. The system preferably has a spherical retro-reflector 24a having its center of curvature coincident with the source 21 such that the retro-reflector 24a reflects light back into the arc gap of the source 21 causing substantially no magnification of the image. This retro-reflection will increase (nearly double) the amount of light flux directed toward the target I, which is preferably the end of a lightguide 26.

The light from the source 21 and the light reflected by the retro-reflector 24a are collimated into parallel rays which travel parallel to the axis 28 of the paraboloid collimating reflector 22. These parallel rays are then focused into a spot at the target I with a focusing reflector 23 having a substantially half-paraboloid shape with substantially the same conic parameters as the paraboloid collimating reflector 22. This focusing reflector 23 is placed such that its axis 29 is substantially colinear with the axis of the first paraboloid section resulting in a system having unit magnification and producing the brightest intensity spot possible.

FIG. 2b depicts an alternative embodiment of the fundamental unit as depicted in FIG. 2a, wherein the spherical retro-reflector 24a is replaced by a second half-paraboloid shaped reflector 22a together with a planar mirror retro-reflector 24b placed perpendicular to the axis 28 of the first and third paraboloid sections. As will be readily appreciated by one skilled in the art, the first 22 and second 22a half-paraboloid sections can be interchangeably replaced by a single reflector having the shape substantially of a full paraboloid when planar mirror retro-reflectors 24b are employed.

Figure 3A:
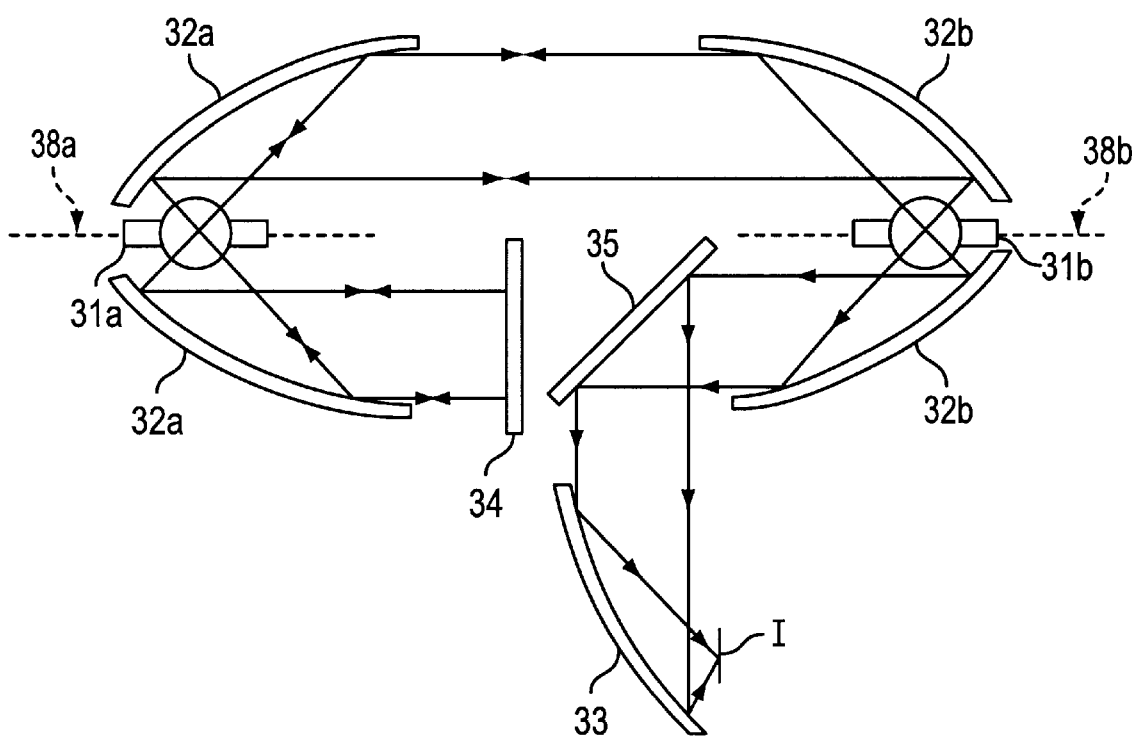
FIG. 3a is a schematic diagram showing the cascading of two parabolic system fundamental units wherein the output of two lamps is coupled into a single target using two full paraboloid collimating reflectors, a half-paraboloid focusing reflector, and plane mirror for retro-reflection.

FIG. 3a depicts an embodiment of the present invention wherein two fundamental unit systems, as depicted in FIGS. 2a 2b, are arranged in a cascading relationship. The first source 31a is arranged at the focus of a reflector 32a which is substantially in the shape of a full paraboloid such that the light collected by the reflector 32a is collimated into parallel rays. A retro-reflector 34 comprised of a plane mirror is situated in front of the output face of the paraboloid reflector 32a covering half of the aperture of the reflector and aligned perpendicular to the axis 38a of the reflector such that the light is reflected back on its own path and refocused back through the first source 31a. The light collimated by the upper half of the paraboloid reflector will be nearly doubled, comprised of light directly from the arc itself and from retro-reflection. The output of the first source 31a is thereby directed into a second paraboloid reflector 32b having a shape substantially of a paraboloid with a source 31b located at its focus. The light from reflector 31b is focused into the arc of source 31b by reflector 32b.

The total output comprised of light from the first source 31a and part of the second source 31b will be collimated into parallel rays by the lower half of the second reflector 32b. A redirecting reflector 35, preferably a planar mirror situated at an angle relative to the axis 38b of reflector 32b, redirects the output from reflector 32b into a focusing reflector 33 where it is focused into a spot on the target I.

The portion of light emitted by source 31b in the direction of the upper half of reflector 32b (facing upwards as represented by FIG. 3a) will be collimated by reflector 32b, focused by the upper half of reflector 32a through the arc of source 31a and then retro-reflected back into the arc of source 31a by the combination of the lower half of reflector 32a and retro-reflector 34. This retro-reflected light is then collimated by reflector 32a, focused by reflector 32b through the arc of source 31b, redirected by the redirecting reflector 35, and collected by targeting reflector 33 together with the other light described previously into a spot at the target I. Assuming no losses due to imperfections and identical sources, the brightness at the target I produced by such a cascaded system approaches four times the brightness of a single source without retro-reflection.

Figure 3B:
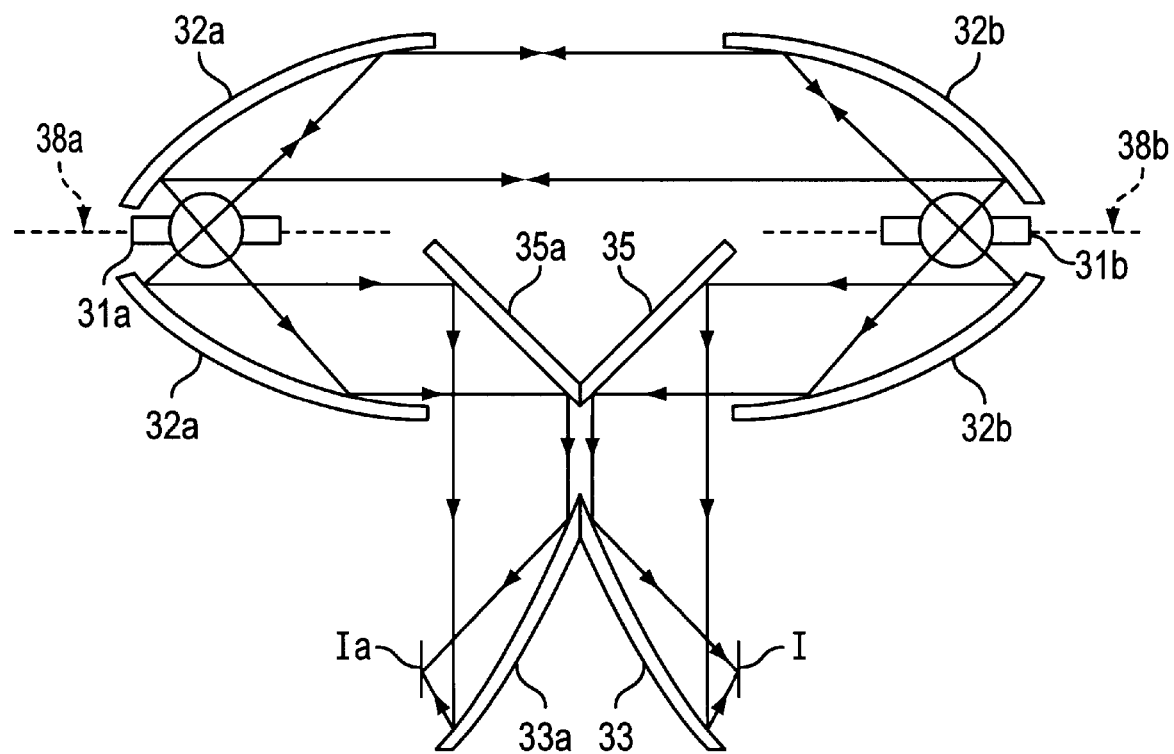
FIG. 3b is a schematic diagram showing the cascading of two parabolic system fundamental units wherein the output of two lamps is coupled into two targets using two full paraboloid collimating reflectors, and two half-paraboloid focusing reflectors.

FIG. 3b depicts an alternative embodiment of the present invention, with a similar layout as that depicted by FIG. 3a, except that two targets I and Ia are used instead of one. Comparison of the embodiments depicted by FIGS. 3a and 3b reveals that retro-reflector 34 has been omitted from the embodiment of FIG. 3a and replaced by a second redirecting reflector 35a and a second targeting reflector 33a which are oriented in similar manner to redirecting reflector 35 and targeting reflector 33 so as to couple light from sources 31a and 31b into target Ia.

Figure 4:
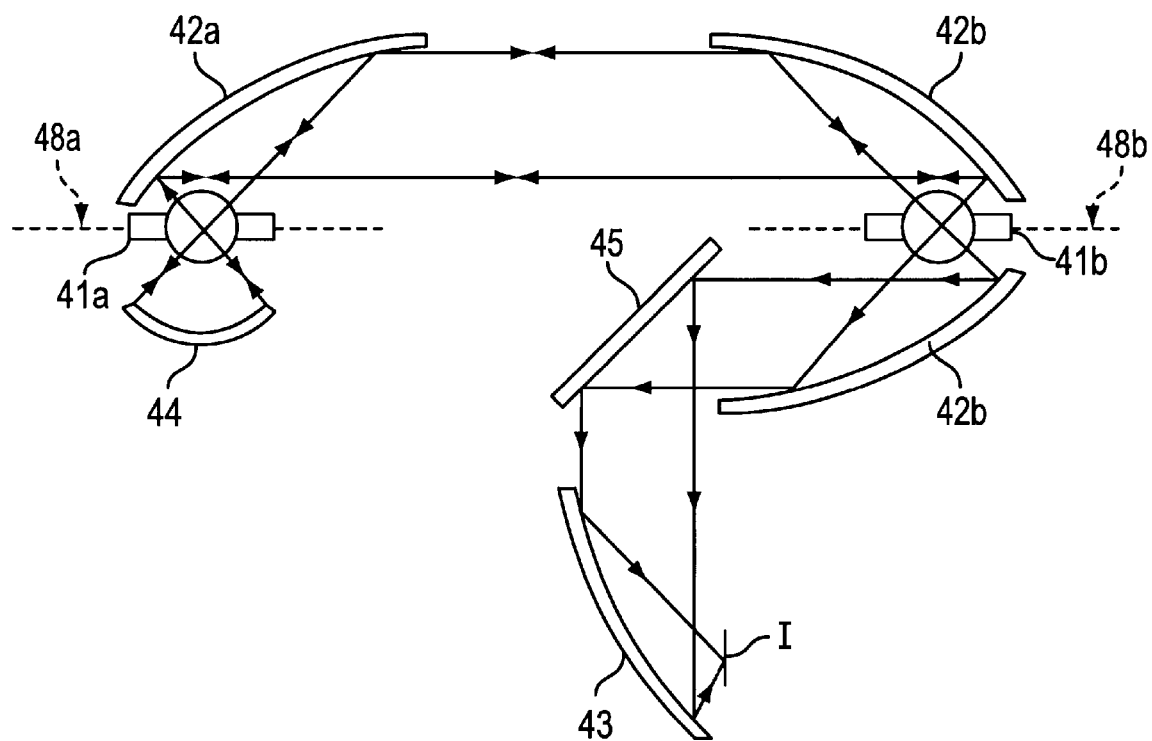
FIG. 4 is a schematic diagram showing the cascading of two parabolic system fundamental units wherein the output of two lamps is coupled into a single target by a full paraboloid collimating reflector, a half-paraboloid collimating reflector, a half-paraboloid focusing reflector, and a spherical mirror for retro-reflection.

FIG. 4 depicts an alternative embodiment of the present invention which is similar in configuration to the embodiment depicted by FIG. 3a except that a spherical concave mirror 44 is used as the retro-reflector (as was similarly employed in the system depicted by FIG. 2a). The performance of the system of FIG. 4 is essentially identical to that of FIG. 3a; the total flux concentrated at target I is essentially four times that of a single source with no retro-reflection. Similar to FIG. 2a, reflector 42a is a half paraboloid as opposed to the full paraboloid reflector 32a employed in the embodiment depicted by FIG. 3a.

Figure 5:
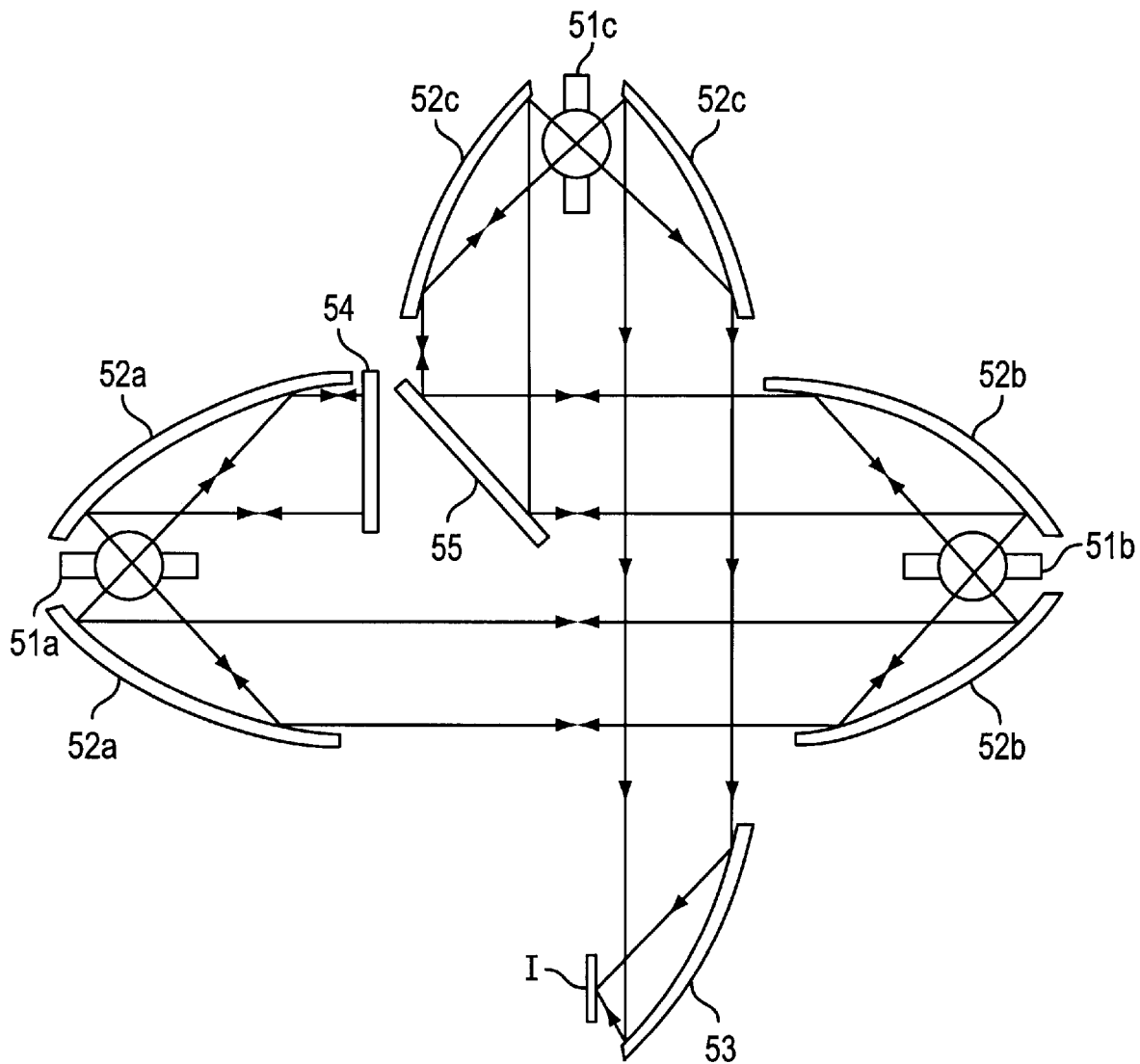
FIG. 5 is a schematic diagram showing the cascading of three parabolic system fundamental units according to the present invention wherein the output of three lamps is coupled into a single target by three full paraboloid collimating reflectors, a half paraboloid focusing reflector, and a plane mirror retro-reflector.

Although the above description shows the cascading of two sources into a single output, in practice more lamps can be cascaded by using the same fundamental units of sources and paraboloid reflectors. FIG. 5 depicts a preferred embodiment wherein three sources, 51a, 51b, and 51c are cascaded by a series of paraboloid collimating reflectors 52a, 52b, and 52c, retro-reflector 54, redirectional reflector 55, and focusing reflector 53 into a spot at target I. In this case, the theoretical total flux at the target I, without consideration of the mirror losses at the reflectors and lamp envelope reflections at the sources, is 6 times that achievable with a single source using no retro-reflection.

More lamps can be cascaded similarly with corresponding paraboloid collimating reflectors to a desired number (n) of sources.

As will be appreciated by one of ordinary skill in the art, in the actual implementation of the present invention, there will be a limit as to how many lamps can be cascaded according to the present invention while still producing a marked improvement in flux at the target. Light flux can be lost to various sources of imperfections in the system, including the degree of reflectivity of the reflectors, the Fresnel reflection at the glass/air interfaces of the lamp envelope for arc lamps, and any optical aberrations introduced by the reflectors, the glass envelope of arc lamps, and the multiple passes.

Besides increasing flux at the target spot, parabolic cascading condensing and collecting systems according to the present invention can be used to produce other desirable results. For example, multiple sources cascaded according to the present invention can advantageously be used to provide redundancy in the radiations sources. In a cascaded system similar to FIGS. 3a and 3b having two sources, the output radiation focused on the target spot can be either the combination of the radiation from both sources, or the radiation from each source separately. If only one source is used during normal operation of the system, and that source fails for some reason, the second source can be used instead of changing failed source. With a cascading system according to the present invention, the failed source simply can be shut down, and the second source can be switched on within seconds without requiring any physical changes to the system. This feature is especially advantageous when significant downtime for the coupling system is undesirable.

Similarly, the source employed in embodiments of the present invention can be two chosen which produce different types of radiation (different wavelengths, intensities, etc.). For example, in a two source system, the first source can be a mercury arc lamp, and the second source can be a sodium arc lamp. Both of these arc lamps are known as being very efficient, energy saving lamps. The mercury lamp emits a visible light having a wavelength in the blue range, while the sodium lamp emits a visible light having a wavelength in the yellow range. While these types of lamps when used separately produce light which is undesirable for illumination, such as surgical illumination, when these two wavelengths of light are used in combination, the overall color output light is more similar to white light. As will be readily appreciated by one skilled in the art, this ability to combine lamps which produce different spectral output allows systems according to the present invention to be easily tailored to various spectral output characteristics.

In addition, the size of the paraboloids can be half paraboloids as described or they can be larger or smaller in their circular extents depending on applications. In accordance with one embodiment, the paraboloid sections are smaller than half paraboloids, e.g., greater than quarter paraboloids but less than half paraboloids.

The invention having been thus described, it will be apparent to those skilled in the art that the same may be varied and modified in many ways without departing from the spirit and scope of the invention. Any and all such modifications are intended to be included within the scope of the following claims.

What is claimed is:

1. An electromagnetic radiation collecting and condensing optical system for providing a high intensity light output with a relatively high radiation flux in a small area, comprising:

a first concave reflector having a focus, said first reflector having substantially a paraboloid shape;

a first source of electromagnetic radiation located near said focus of said first concave reflector;

a retro-reflector designed to redirect electromagnetic radiation back through a first side of said first source and out through a second side of said first source such that substantially all of the radiation emitted by said first source is directed upon a first substantially paraboloid section of said first reflector;

a second concave reflector having a focus, said second reflector having substantially a paraboloid shape with a second substantially paraboloid section;

a second source of electromagnetic radiation located near said focus of said second concave reflector;

a concave focusing reflector having a focus, said focusing reflector having at least a portion with paraboloid shape;

a target placed near said focus of said focusing reflector; and wherein said first reflector and said retro-reflector are oriented so as to collimate substantially all of the radiation from said first source and direct it into said second reflector, said second reflector is oriented so as to collimate substantially all of the radiation from said first reflector and said second source and redirect it into said focusing reflector, and said focusing reflector is oriented so as to collect radiation reflected by said second reflector and focus radiation onto said target.

2. The system of claim 1 wherein said first and second paraboloid sections are half paraboloids.

3. The system of claim 1 wherein said first and second paraboloid sections are less than half paraboloids and greater than quarter paraboloids.

4. An electromagnetic radiation collecting and condensing optical system according to claim 1, further comprising:

a third concave reflector having a focus, said third reflector having substantially a paraboloid shape;

a third source of electromagnetic radiation located near said focus of said third concave reflector;

wherein said third reflector is oriented between said first reflector and said second reflector so as to collimate substantially all of the radiation exiting said first reflector and substantially all the radiation emitted by said third source and redirect it into said second reflector.

5. An electromagnetic radiation collecting and condensing optical system according to claim 1, wherein said target is an optical lightguide.

6. An electromagnetic radiation collecting and condensing optical system according to claim 5, wherein said optical lightguide is of a type selected from the group consisting of a lens, a homogenizer, an internally reflective tube, an optical fiber, and an optical fiber bundle.

7. The system of claim 6, wherein said lightguide is selected from the group consisting of circular cross-section lightguides, polygonal cross-section lightguides, tapered lightguides and combinations thereof.

8. An electromagnetic radiation collecting and condensing optical system according to claim 1, wherein at least one of said first and second sources is a high intensity arc lamp.

9. An electromagnetic radiation collecting and condensing optical system according to claim 8, wherein said high intensity arc lamp is a type selected from the group consisting of mercury xenon, xenon, metal halide, HID, tungsten halogen, and halogen.

10. An electromagnetic radiation collecting and condensing optical system according to claim 1, wherein said first and second sources emit radiation having different intensities.

11. An electromagnetic radiation collecting and condensing optical system according to claim 1, wherein said first and second sources emit radiation having different wavelengths.

12. An electromagnetic radiation collecting and condensing optical system according to claim 1, wherein at least one of said first and second reflectors are treated so as to selectively filter radiation having predetermined wavelengths.

13. An electromagnetic radiation collecting and condensing optical system according to claim 1, wherein said first reflector has an optical axis and said retro-reflector comprises a flat reflector oriented perpendicular to said optical axis.

14. An electromagnetic radiation collecting and condensing optical system according to claim 1, wherein said retro-reflector comprises a concave spherical reflector having a center of curvature, and wherein said spherical reflector is aligned so as place said first source near said center of curvature.

15. A cascaded electromagnetic radiation collecting and condensing optical system for providing a high intensity light output with a high radiation flux in a small area, comprising:

a plurality of concave reflectors each having an optical axis and a focus, each of said plurality of concave reflectors having a substantially paraboloid section with a substantially paraboloid shape;

a plurality of sources of electromagnetic radiation, each source of said plurality of sources paired with a reflector of said plurality of reflectors, each said source located near said focus of the reflector to which it is paired, each source and reflector pair oriented such that each said reflector receives electromagnetic radiation from said source to which it is paired and collimates said radiation in rays parallel to said optical axis of said reflector;

a first focusing reflector having a focus, said focusing reflector having at least a portion with a paraboloid shape;

a target placed near the focus of said focusing reflector; and wherein said plurality of reflectors redirect electromagnetic radiation emitted from said plurality of sources in a cascading manner onto said focusing reflector, and wherein said focusing reflector condenses said redirected radiation onto said target.

16. The system of claim 15 wherein each said paraboloid section is a half paraboloids.

17. The system of claim 15 wherein each said paraboloid section is less than half paraboloids and greater than quarter paraboloids.

18. A cascaded electromagnetic radiation collecting and condensing optical system according to claim 15, further comprising:

a second concave focusing reflector having a focus, said second focusing reflector having at least a portion with substantially a half paraboloid shape; and a second target placed near said focus of said second focusing reflector;

wherein said plurality of reflectors redirect electromagnetic radiation emitted from said plurality of sources in a cascading manner onto said targeting reflector and said second focusing reflector, and wherein said first focusing reflector condenses a first portion of said redirected radiation onto said target, and said second focusing reflector condenses a second portion of said redirected radiation onto said second target.

19. A cascaded electromagnetic radiation collecting and condensing optical system according to claim 15, further comprising:

a retro-reflector; and wherein said retro-reflector redirects electromagnetic radiation back through a first side of a first source of said plurality of sources and out through a second side of said first source such that substantially all of the radiation emitted by said first source is directed upon a substantially half paraboloid section of the reflector to which said first source is paired.

20. A cascaded electromagnetic radiation collecting and condensing optical system according to claim 19, wherein said reflector to which said first source is paired has an optical axis, and said retro-reflector comprises a flat reflector oriented perpendicular to said optical axis.

21. A cascaded electromagnetic radiation collecting and condensing optical system according to claim 19, wherein said retro-reflector comprises a concave spherical reflector having a center of curvature, and wherein said spherical reflector is aligned so as place said first source near said center of curvature.

22. A cascaded electromagnetic radiation collecting and condensing optical system according to claim 15, wherein said target is an optical lightguide.

23. A cascaded electromagnetic radiation collecting and condensing optical system according to claim 22, wherein said optical lightguide is of a type selected from the group consisting of a lens, a homogenizer, an internally reflective tube, an optical fiber, and an optical fiber bundle.

24. The system of claim 23, wherein said optical lightguide is selected from the group consisting of circular cross-section lightguides, polygonal cross-section lightguides, tapered lightguides and combinations thereof.

25. A cascaded electromagnetic radiation collecting and condensing optical system according to claim 15, wherein at least one of said plurality of sources is a high intensity arc lamp.

26. A cascaded electromagnetic radiation collecting and condensing optical system according to claim 25, wherein said high intensity arc lamp is a type selected from the group consisting of mercury xenon, xenon, metal halide, HID, tungsten halogen, and halogen.

27. A cascaded electromagnetic radiation collecting and condensing optical system according to claim 15, wherein at least two sources within said plurality of sources emit radiation having different intensities.

28. A cascaded electromagnetic radiation collecting and condensing optical system according to claim 15, wherein at least two sources within said plurality of sources emit radiation having different wavelengths.

29. A cascaded electromagnetic radiation collecting and condensing optical system according to claim 15, wherein said plurality of reflectors comprises at least three reflectors.

30. A cascaded electromagnetic radiation collecting and condensing optical system according to claim 15, wherein said plurality of sources comprises at least three sources.

31. A cascaded electromagnetic radiation collecting and condensing optical system according to claim 15, wherein at least one reflector within said plurality of reflectors is treated so as to selectively filter radiation having predetermined wavelengths.

* * * * *